United States Patent
Kwasny

(10) Patent No.: US 7,338,226 B2
(45) Date of Patent: *Mar. 4, 2008

(54) AEROSOL CAN CONTAINING A TWO-COMPONENT EPOXY-PAINT

(76) Inventor: Peter Kwasny, Rheinweg 39, Schaffhausen (CH) 8200

(*) Notice: Subject to any disclaimer, the term of this patent is extended or adjusted under 35 U.S.C. 154(b) by 295 days.

This patent is subject to a terminal disclaimer.

(21) Appl. No.: 10/488,568

(22) PCT Filed: Sep. 5, 2002

(86) PCT No.: PCT/EP02/09918

§ 371 (c)(1),
(2), (4) Date: Aug. 2, 2004

(87) PCT Pub. No.: WO03/022903

PCT Pub. Date: Mar. 20, 2003

(65) Prior Publication Data

US 2004/0262336 A1    Dec. 30, 2004

(30) Foreign Application Priority Data

Sep. 7, 2001   (DE) ................. 101 44 133

(51) Int. Cl.
*B05B 11/00* (2006.01)
*B05B 15/00* (2006.01)
*B67D 5/06* (2006.01)
*C08L 63/00* (2006.01)

(52) U.S. Cl. ............... 401/190; 222/129; 222/142.5; 222/142.6; 222/145.1; 222/505; 222/510; 523/400; 523/454; 523/463

(58) Field of Classification Search ............ 401/137, 401/190; 222/129, 135, 142.5, 142.6, 145.1, 222/145.5, 145.6, 325, 505, 510; 523/400, 523/454, 463

See application file for complete search history.

(56) References Cited

U.S. PATENT DOCUMENTS

| | | | | |
|---|---|---|---|---|
| 3,235,126 A | * | 2/1966 | Shay | 222/80 |
| 3,255,926 A | * | 6/1966 | Modderno | 222/136 |
| 3,343,718 A | * | 9/1967 | Siegel et al. | 222/1 |
| 4,382,525 A | * | 5/1983 | Kobayashi et al. | 220/678 |
| 5,405,051 A | * | 4/1995 | Miskell | 222/23 |
| 5,431,303 A | * | 7/1995 | Miskell | 222/54 |
| 7,063,236 B2 | * | 6/2006 | Greer et al. | 222/136 |
| 7,204,392 B2 | * | 4/2007 | Kwasny et al. | 222/83 |
| 2006/0049278 A1 | * | 3/2006 | Hoshino | 239/333 |
| 2006/0201969 A1 | * | 9/2006 | Kwasny | 222/135 |

FOREIGN PATENT DOCUMENTS

EP     0062609     * 10/1982

OTHER PUBLICATIONS

English abstract of EP 0062609.*

* cited by examiner

*Primary Examiner*—Michael J. Feely
(74) *Attorney, Agent, or Firm*—Berliner & Associates

(57) ABSTRACT

The invention relates to an aerosol can containing a two-component paint with an aerosol preparation, in particular for use in the automotive industry and for automotive repairs. Said aerosol can contains a binding agent component and a curing component. The binding agent component contains a curable epoxy parent component, solvents and a propellant and the curing component contains a cross-linking agent, which is suitable for curing the epoxy binding agent. The curing component is housed separately from the binding agent component in a cross-linking casing, which is located in the aerosol paint can and can be activated externally.

21 Claims, No Drawings

AEROSOL CAN CONTAINING A TWO-COMPONENT EPOXY-PAINT

The invention relates to an aerosol can containing a two-component paint with an aerosol preparation for two-component epoxy varnishes for general industrial and household industrial purposes, for use in the construction, automotive and automotive repair industries.

A variety of aerosol compositions for aerosol paint cans have been known for years. Preferably, these are one-component aerosol compositions for the do-it-yourselfer, automotive and automotive repair industries.

In recent years two-component PUR systems in aerosol paint cans for automotive as well as repair purposes have been gaining more and more importance in the market. Such two-component systems comprise a parent component, an OH group containing acrylate or polyester resin and a polyisocyanate as curing component. Aerosol paint cans of this type are employed to apply primers, undercoats, priming fillers, fillers, finishing coats, clear coat finishes etc., primarily for vehicles such as passenger cars, trucks, busses, street cars, railroads, road/rail tankers and containers.

On the other hand, almost no two-component aerosol compositions in aerosol paint cans have existed for general industrial and household industrial purposes, for the building sector, machinery construction industry etc. Known in such applications are coatings consisting of two-component epoxy systems applied using either sprayers, rollers, brushes or, employing a casting method, with combs, blades and spatulas, with all these two-component systems having cold-curing properties, that is they harden at room temperatures. Nevertheless, it has not been successful hitherto to provide two-component aerosol paint cans based on ready-to-use epoxy systems.

Usually, touch-up work and repairs of such systems is thus achieved manually with major expense in terms of equipment, work and time using identical two-component epoxy materials. For this purpose, sprayers, casting devices, rollers, brushes, combs, blades, spatulas, spray tanks and mixing vessels are required. Mixing ratios between parent component and curing agent have to be exactly set volumetrically or gravimetrically, suitable precision weighers or volumetric measuring systems must be available.

Such expense could be spared if damaged coatings were to be repaired, touched-up or eliminated or new coatings applied with the aid of an aerosol formulation for two-component epoxy aerosol paint cans.

It is thus the objective of the present invention to provide a two-component aerosol paint can with an epoxy paint system especially suited for repair purposes.

This objective is achieved by providing a two-component aerosol paint can as described in claim 1.

These novel aerosol paint cans containing an aerosol preparation based on the two-component epoxy technology usually comprise:
- an epoxy parent component,
- a solvent mixture to obtain applications ready to be spray-applied,
- a propellant gas, for example dimethyl ether, propane/butane or fluorocarbons and
- an epoxy curing agent in a separate container to be used as hardening constituent for the epoxy parent component.

Using such a novel two-component aerosol paint can enables the exactly allotted curing agent to be emptied, in a simple manner, from a separate aluminum cartridge into the aerosol paint can with a pot life, depending on the respective composition, ranging between three and 24 hours, such that via can valve and sprayhead its contents can be applied most precisely and closely restricted to the damage surface or area to be repaired without experiencing visible transitions, blisters and pinholes and without grooves and brush strokes.

Normally, coatings of high-solids consistency cannot be achieved with the help of aerosol can applications. A commercially available aerosol paint can contains low-solids one-component paint systems, usually having physical or oxidative drying characteristics, that are completely unsuited—as far as composition, solids and film thickness are concerned—for touching up, repairing or re-coating two-component epoxy systems.

As has been disclosed in DE 196 36 221 C2 it is possible to increase the normally achievable dispensing rate of aerosol paint cans from eight to ten grams per ten seconds to 20 to 25 g per ten seconds. This also enables significantly greater film thicknesses to be obtained with a few spraying operations only so that by spending a reasonable amount of labor the pace of work can be accelerated considerably. This is brought about by the use of a propane/butane propellant gas mixture having a high propane content in conjunction with a flat-spray nozzle. In this way the can contents can be discharged at a higher constant pressure and high dispensing rate.

Combining the teachings of DE 196 36 221 C2 with those of the present invention particularly favorable results are achieved.

With commercially available, freely purchasable or self-made two-component epoxy systems, which within the paint formulation are either water-dilutable, solvent containing or non-solvent containing and are applied by way of two-component aerosol paint cans, touch-up coatings are surprisingly achievable that meet all the requirements linked with safe, most precise repairs, touch-up work and re-coatings, simple application, environmentally sound waste disposal, secure handling, fast through-drying, accurate curing, resistance to chemicals, long-term usability and stability.

In the event aerosol paint cans have for the formulation of two-component epoxy aerosol compositions separate plastic casings as described, for example, in WO-A-8 500 175 (Zarga) useful results can be obtained. In some cases, however, a shorter storage stability of the two-component aerosol composition may be encountered, usually when solvents of high creeping capability are involved, even if the epoxy parent component in the aerosol paint can and the epoxy curing agent in a separate plastic cartridge are kept separate. Since all aerosol paint cans are pressurized at up to nine bar depending on temperature conditions the plastic cartridges of type Zarga holding the curing agent are not always the most expedient solution. Express reference is made here to the so-called Zarga technology.

Across the walls of the plastic cartridges a pressure balance may take place so that propellant gas, moisture in the form of water vapor and gaseous solvents may also penetrate the walls of the cartridge, enter its interior and in this way cause the epoxy curing agents employed to precipitate and thus become useless.

For time reasons the storage stability is determined by means of an oven storage method at 50° C. Plastic cartridges in some instances and with some solvent combinations cause the epoxy curing agent to precipitate after, on average, two to four weeks' storage time in the oven at 50° C.; many years of experience have shown that an oven storage of three months at 50° C. is necessary to be able to arrive at conclusive evidence as to a storage time of one to two years at room temperature.

Making use of an aluminum cartridge integrated into the can as provided for by P 101 14 624.8 will solve the problem of an inadequate storage life of two-component epoxy aerosol compositions. Due to the fact that a gas diffusion was prevented through the use of an aluminum cartridge for the curing agent the absolutely necessary storage stability requirement of three months at an oven temperature of 50° C. could be satisfied without difficulty. In particular, such a storage stability may also be attained in case aromatic solvents are used.

P 101 14 624.8 relates to a pressurized can with a skirt, a dome accommodating a valve, a concavely shaped bottom, an inner casing attached to a cup, a push rod arranged in the inner casing said rod being actuated through the cup and intended to force open the inner casing with said inner casing being joined to the cup via a spring cage, said spring cage containing a spring-loaded trigger element acting on the push rod with said push rod acting on a cover arranged at the can-side end of the inner casing and forcing off said cover when actuated, with a membrane being arranged between push rod and trigger element and sealing off the inner casing hermetically against the contents of the pressurized can at its bottom cup-side end. The membrane and inner casing are preferably of one-piece design and made of aluminum.

Expediently, the above described inner casing has a receptacle located at its extreme end which serves to secure it at the spring cage with the membrane being arranged on the transition element between inner casing and receptacle. Moreover, said receptacle is appropriately attached to the spring cage, in particular by having the free end of the receptacle passing around an outer projection of the spring cage.

The spring cage itself may be located on the bottom cup or on the valve disk in the dome of the pressurized can. When arranged in the dome the triggering action is effected via a trigger pin acting through a receptacle on the push rod and, after the pressurized can has been actuated, being replaced in the receptacle by a valve element.

Alternatively, the pressurized can as per P 101 14 624.8 comprising a skirt, a dome accommodating a valve, a bottom, an inner casing attached to a cup, a push rod arranged in the inner casing said rod being actuated through the cup and intended to force open the inner casing, may also be designed in such a manner that said inner casing forming an integral part with the cup located in the bottom of the can with a spring cage arranged on the cup inside the inner casing, said spring cage containing a spring-loaded trigger element acting on the push rod with said push rod acting on a cover arranged at the can-side end of the inner casing and forcing off said cover when actuated. In this case, inner casing and cup are preferably of one-piece design and made of aluminum. In this embodiment as well the spring cage is preferably secured in a central molding of the cup.

Nevertheless, it is to be noted that the pressurized cans with two-component epoxy paint systems according to the invention may be customary, conventional two-component cans and are not limited to pressurized cans according to the Zarga technology or those outlined in P 101 14 624.8 as described above. Most important is, however, that the two-component epoxy paint system retain the required stability throughout their storage period, which means epoxy parent component and epoxy curing agent are reliably kept separate from each other.

Until today there have been no aerosol compositions in the market for two-component epoxy aerosol paint cans. Two-component aerosol paint cans for two-component PUR systems have been developed for automotive repair purposes. However, such two-component PUR systems are unsuited for new coatings and touch-up work on two-component epoxy systems.

Primarily by combining the teachings of DE 196 36 221 C2 with two-component pressurized cans of the "Zarga" technology and/or those of P 101 14 624.8 in conjunction with commercially available two-component epoxy paint systems aerosol preparations are surprisingly arrived at that lend themselves to the production of effective and useful touch-up, repair and new coatings for use in the above mentioned industrial segments.

These aerosol paint cans yield the required rate of between 20 and 22 g of paint material to be discharged from the spray can in ten seconds as is necessary to touch-up/repair high-solids systems.

Filling the epoxy parent component separately into the two-component aerosol paint can and the epoxy curing agent separately into a separate aluminum cartridge as described in property right P 101 146 624.8 will at any rate ensure that the required storage life of between one and two years at room temperature is obtained.

The invention can be used for general industrial and household industrial purposes, for use in the construction, automotive and automotive repair industries as well as similar applications.

Aerosol compositions according to the invention are usually employed for floor linings/coatings in power stations, breweries, food processing plants, chemical operations, for marine, shipbuilding applications and for boats; for plant maintenance purposes, paint coats resistant to chemicals; in machine construction, for vessel building, vessel lining, tank coating purposes; for bridges, road construction, structures; for tiles, bathtubs, ceramics, porcelain; for laminates, floor coverings, GRP, glass fibers; for corrosion-resistant coatings of steel, aluminum and zinc structures; they are applied to containers, vehicles, rail vehicles; for concrete linings, repairs of brick and concrete structures; and for impregnation and insulation purposes, for anti-slip and abrasion-resistant coatings.

Commercially available two-component epoxy systems based on a wide variety of parent components and curing agents can be obtained in sufficient quantity. The mixing ratios of such systems may range by weight between one-to-one and ten-to-one depending on the respective formulation approach. Favorable for use with two-component aerosol paint cans are formulations comprising parent component/curing agent ratios ranging between 3:1 and 6:1 due to the limited capacity of the curing agent cartridge, with a container capacity of approx. 25 g.

Particularly favorable are all formulations that have a mixing ratio of 4:1 by weight or 80 g to 20 g of parent component/curing agent.

This permits 60 to 150 g, in particular 80 to 120 g of undiluted epoxy parent component to be filled in. As has been determined by extensive laboratory examinations and based on information disseminated by relevant raw material suppliers parent component to curing agent variations ranging between 83:17 and 77:23 may be employed as a rule without having to worry about deviations as to application, gloss, curing, usability and life characteristics.

Therefore, fillings of between 100 and 120 g of undiluted epoxy parent material are to be given preference with an amount of approx. 25 g of epoxy curing agent in an aluminum cartridge.

Of particular advantage are weighed-in quantities of parent material in the range of 110 to 115 g with 25 g of epoxy curing agent in the cartridge.

For a spray application using a two-component aerosol paint can solvent mixtures are required to attain compositions ready to be spray-applied, good flowout, a smooth surface, sufficient material discharge (20 to 22 g in 10 s) and minimum stray spray mist.

Both the epoxy parent component and the epoxy curing agent are capable of being diluted. Irrespective of whether the originally formulated two-component epoxy system contains solvents or is free from solvents it is recommendable based on considerations, experience and tests to blend the epoxy parent component with a solvent mixture and propellant gas and fill in the epoxy curing agent component in non-diluted condition, preferably into an aluminum cartridge.

Two-component epoxy systems can primarily be diluted with alcohols, preferably isopropanol, aromatics, preferably xylole, ketones, preferably acetone, esters, preferably butyl acetate, and blends of these constituents.

A dilution may be applied over a wide range of mixing ratios between 75 g of epoxy parent component to 25 g of solvent mixture and 50 g of epoxy parent component to 50 g of solvent mixture.

Preferable for the spray can applications are spraying viscosity characteristics from 18" to 30" in a DIN beaker with 3-mm nozzle.

In particular viscosities ranging between 22" and 26" in a DIN beaker with 3-mm nozzle have proven their worth which corresponds to a mixing ratio of between 75:25 and 55:45 g.

Of special advantage are mixing ratios comprising 60 to 65 g of epoxy parent component with 35 to 40 g of solvent mixture which roughly translates to a viscosity of between 23.5" and 24.5" in a DIN beaker with 3-mm nozzle.

Alcohols and aromatics function as solvents in a limited framework between 10 and 20% in relation to the epoxy parent component. Ketones and esters are compatible without limitation. Mixtures of ketones and esters have proven especially advantageous for spray application purposes. Acetone und butyl acetate of a ratio of 50:50 to 90:10 yield particularly useful spraying results and lend optimum application properties. Of special advantage is a combination of acetone and butyl acetate at a ratio of 80:20 through 90:10. Ideally, a combination of 85 g of acetone and 15 g of butyl acetate is employed. All data given above are based on weights.

As propellant gas for the two-component aerosol paint can dimethyl ether (DME), propane/butane as described in DE 196 36 221 C2 and fluorocarbons (Frigen 143, 144) are especially suited. For solvent-containing and solvent-free two-component epoxy systems based on customary paint formulations propane/butane and DME have proven to be of particular advantage. For water-dilutable paint formulations of two-component epoxy systems DME was found to be particularly compatible since other propellant gases may possibly give rise to precipitation.

The propellant gas as well could be used to achieve useful spraying results over a wide range of ratios between 75:25 and up to 40:60 of diluted paint to propellant gas. All mixtures consisting of 65 g pre-diluted epoxy parent component to 35 g of propellant gas up to ratios of 40:60 proved to be advantageous.

Ideally, a two-component aerosol paint can of 400 ml capacity was filled with:

180 g of pre-diluted epoxy parent component with a solvent mixture, for which 114 g of non-diluted epoxy parent component and 66 g of a solvent mixture was used. The solvent mixture consisted of 85 g of acetone and 15 g ob butyl acetate.

DME was used as propellant gas with 134 g of DME being added to the pre-diluted 180 g of epoxy parent component.

In paint chemistry a virtually unlimited amount of two-component epoxy systems exist. There are many chemical reaction mechanisms according to which commercially available two-component systems can be produced.

The two-component aerosol paint cans according to the invention lend themselves to a multitude of applications with a wide range of different characteristics to suit the numerous specific requirements and needs. Accordingly, the respective paint formulations may very greatly vary to serve the relevant application purposes. From the above described fields of use numerous commercially available two-component epoxy systems result that may also vary extremely as far as their chemical composition is concerned. Suited for application in a two-component aerosol paint can are all reaction mechanisms of two-component epoxy systems as known in chemistry.

Epoxy resins and epoxy curing agents as a reactive mixture form the epoxy resin binding agent that hardens through polyaddition reactions. According to DIN 7728 epoxy resins are oligomeric compounds having more than one epoxy group per molecule. During the curing process high-molecular, three-dimensional networks are produced through cross-linking reactions from mostly low-viscous or low-molecular, monomeric and oligomeric components of the binding agent. Nodes in the network result from the reactions of the functional groups of resins and curing agents. (Knittel, Lehrbuch der Lacke und Beschichtungen, 2. Edition, Volume 2, 1998.)

As epoxy resins for two-component aerosol paint cans especially those based on glycidyl ethers, glycidyl esters, glycidyl amines, cycloaliphatic epoxys and glycidyl isocyanurates are suited.

As epoxy curing agents in particular amine-curing agents such as aliphatic and cycloaliphatic amines, aromatic amines and modified amines, polyamide-curing agents such as polyaminoamides, dicyandiamide, cyclic acid anhydrides, polyisocyanates, amino-functional polyacrylates and the like can be used.

In certain cases, so-called reactive thinners, e.g. butyl acrylate, may be added to aminofunctional polyacrylates, said thinners contributing to the chemical hardening process through a Michael addition.

Amine-curing agents that can be broadly used are primarily produced by adduct formation with epoxy-based resins through amide formation with fatty acids or via Mannich-base reactions with phenols and formaldehyde.

For various application purposes some formulation examples for two-component epoxy systems have been selected that are used in two-component aerosol paint can in accordance with the invention. The invention is explained in more detail by way of the following examples.

EXAMPLE 1

Two-component epoxy floor coating, solvent-free, minimum yellowing, abrasion resistant.
Component A

| | |
|---|---|
| 38.5 | Beckopox EP 128 (Solutia Austria GmbH) |
| 0.4 | Aerosil 380 (Degussa, Frankfurt) |
| 54.0 | Sikron Feinstmehl (Quarzwerke, Bad Lauterberg) |
| 4.5 | Titan Kronos 2059 (Kronos Titan, Lev.) |
| 0.3 | Bayferrox 920 (Bayer, Lev.) |
| 0.3 | Bayferrox 308 (Bayer, Lev.) |
| 0.8 | Additol XL 251 (Solutia) |
| 1.2 | Additol XL 132 (Solutia) |
| 100 | Parts |

Component B

| | |
|---|---|
| 5 | Beckopox EH 625 (Solutia) |
| 15 | Beckopox EH 637 (Solutia) |
| 20 | Parts |

Mixing ratio 5:1=100:20

EXAMPLE 2

Two-component epoxy finishing paint coat, high-duty coating, resistant to chemicals and solvents.
Component A

| | |
|---|---|
| 9.1 | Ti-Pure R 902 (Dupont) |
| 1.8 | Talkum AT extra (Norwegian Talc) |
| 38.6 | Epon Resin 1001 CX 75 (Resolution, formerly Shell) |
| 1.9 | Beetle 216-8 (American Cyanamid Co.) |
| 6.0 | MIBK |
| 9.6 | Methoxypropanol |
| 1.2 | Cyclohexanol |
| 7.1 | Xylole |
| 24.7 | Toluene |
| 100 | Parts |

Component B

| | |
|---|---|
| 16 | Epicure 3214 Curing Agent (Resolution) |
| 9 | MIBK |
| 25 | Parts |

Mixing ratio 4:1=100:25

EXAMPLE 3

Two-component epoxy finishing paint coat, green, highly resistant to chemicals, high-solids containing.
Component A

| | |
|---|---|
| 43.7 | Beckopox EM 443/57XMIBK (Solutia) |
| 3.2 | MPA |
| 36.3 | Chromoxidgrün GN-M (Bayer) |
| 8.3 | Schwerspat EWO (Sachtleben AG) |
| 4.2 | Micro-Talkum AT 1 (Norwegian Talc, Bergen) |
| 0.2 | Aerosil 380 (Degussa) |
| 0.3 | Additol XL 132 (Solutia) |
| 0.5 | Additol XL 255 (Solutia) |
| 3.3 | Xylole |
| 100 | Parts |

Component B

| | |
|---|---|
| 13.2 | Beckopox Eh 631/55 (Solutia) |
| 11.8 | Methoxypropanol |
| 25 | Parts |

Mixing ratio 4:1=100:25

EXAMPLE 4

Two-component epoxy sealing primer, good absorptive-substrate penetrating properties, e.g. on concrete for the purpose of filling pores and solidification.
Component A

| | |
|---|---|
| 70 | Eurepox 710 (Schering) |
| 20 | MIBK |
| 7 | Xylole |
| 3 | Butanol |
| 100 | Parts |

Component B
25 XE 16 (Schering)
Mixing ratio 4:1=100:25

EXAMPLE 5

Two-component road marking paint material
Component A

| | |
|---|---|
| 12.5 | Eurepox 7001/75 (Schering) |
| 6.3 | Acetone |
| 6.2 | MPA |
| 33.0 | Vinylite VAGH (25% in acetone) |
| 4.0 | Bentone 38 (Rheox) |
| 4.2 | Microdol 1 (Norwegian Talc) |
| 8.3 | Blancfixe (Sachtleben) |
| 25.0 | Ti-Pure R 902 (Dupont) |
| 0.5 | Aerosil 380 (Degussa) |
| 100 | Parts |

Component B

| | |
|---|---|
| 12.5 | Versamid 100 (Schering) |
| 7.0 | Acetone |
| 5.5 | MPA |
| 25 | Parts |

Mixing ratio 4:1=100:25

EXAMPLES 6 TO 8

Two-component epoxy anti-corrosion paint coating for steel, aluminum, zinc a.) Wash Primer, Free from Zinc Chromate Component A

| | |
|---|---|
| 27.0 | Eurepox 7001/75 (Schering) |
| 8.0 | MIBK |
| 12.0 | Xylole |
| 3.0 | Butanol |
| 10.0 | Schwerspat EWO (Sachtleben) |
| 10.0 | Talkum AT extra (Norwegian Talc) |
| 15.0 | Heucophos ZP 10 (Heubach) |
| 15.0 | Bayferrox 130 BM (Bayer) |
| 100 | Parts |

Component B
15.0 Euredur 30/55 (Schering)
10.0 Xylole
Mixing ratio 4:1=100:25 b.) Intermediate Coat/Primer

Component A

| | |
|---|---|
| 26.0 | Eurepox 7001/75 (Schering) |
| 19.0 | Xylole |
| 9.0 | Butanol |
| 24.0 | Ti-Pure R 902 (Dupont) |
| 13.0 | Talkum AT extra (Norwegian Talc) |
| 9.0 | Blancfixe (Sachtleben) |
| 100 | Parts |

Component B

| | |
|---|---|
| 15.0 | Euredur 30/55 (Schering) |
| 5.0 | Xylole |
| 5.0 | MPA |
| 25 | Parts |

Mixing ratio 4:1=100:25 c.) Finishing Coat

Component A

| | |
|---|---|
| 39.0 | Eurepox 700 1/75 (Schering) |
| 10.0 | Xylole |
| 3.0 | Butanol |
| 6.0 | MPA |
| 25.0 | TI-Pure R 902 (Dupont) |
| 2.0 | Talkum AT extra (Norwegian Talc) |
| 15.0 | Blancfixe (Sachtleben) |
| 100 | Parts |

Component B

| | |
|---|---|
| 23.0 | Euredur 30/55 |
| 2.0 | Xylole |
| 25 | Parts |

Mixing ratio 4:1=100:25

EXAMPLE 9

Two-component epoxy priming filler, vehicle construction, trucks, containers, for steel, aluminum and zinc.

Component A

| | |
|---|---|
| 25.0 | Beckopox EP 301 (Solutia) |
| 2.0 | Maprenal MF 600 (Solutia) |
| 7.5 | Xylol |
| 3.0 | EPA |
| 1.0 | Bentone 38 (Rheox) |
| 0.3 | Bayferrox 316 (Bayer) |
| 0.5 | Bayferrox 929 (Bayer) |
| 5.5 | Heucophos ZP 10 (Heubach) |
| 11.0 | Schwerspat EWO (Sachtleben) |
| 16.5 | TI-Pure R 902 (Dupont) |
| 20.0 | Micro Talkum 20M2 (Finntalc) |
| 7.7 | Methoxypropanol |
| 100 | Parts |

Component B

| | |
|---|---|
| 8.0 | Methoxypropanol |
| 4.5 | Solvesso 100 |
| 4.8 | Xylole |
| 2.3 | Beckopox EP 301 |
| 1.8 | Laromin C 252 (BASF) |
| 2.5 | Versamid 115 (Schering) |
| 1.1 | Häter K54 (BASF) |
| 25 | Parts |

Mixing ratio 4:1=100:25

EXAMPLES 10 AND 11

Two-component epoxy wash-primer, red-brown, water-dilutable, and two-component epoxy filler, beige, water-dilutable, vehicle construction, trucks and containers, for steel, aluminum, zinc.

a.) Wash-Primer

Component A

| | |
|---|---|
| 20.0 | Demineralized water |
| 8.0 | Curing agent EH 623/80 (Solutia) |
| 20.0 | Uraflex ZU 401 (DSM) |
| 1.0 | Additol XL 270 (Solutia) |
| 1.5 | Aerosil 300 (Degussa) |
| 1.0 | Zinkweiβ Harzsiegel (Heubach) |
| 5.0 | Microdot 1 (Norwegian Talc) |
| 9.0 | Heucophos ZPA (Heubach) |
| 11.0 | Talkum AT extra (Norwegian Talc) |
| 1.5 | Borchigel L 75 (Borchers) |
| 1.0 | Additol XW 390 (Solutia) |
| 12.0 | Demineralized water |
| 100 | Parts |

Component B
25 Beckopox EP 384 W/53 (Solutia)
Mixing ratio 4:1=100:25 b.) Filler
Component A

| | |
|---|---|
| 30.0 | Demineralized water |
| 8.0 | Beckopox EH 623/80 (Solutia) |
| 2.0 | Borchigel L 75 (Borchers) |
| 1.0 | Additol XW 390 (Solutia) |
| 0.5 | Aerosil 300 (Degussa) |
| 0.5 | Bayferrox 920 (Bayer) |
| 3.0 | Sikron SF 600 (Quarzwerke) |
| 10.0 | Kaolin A (Bassermann) |
| 11.0 | Tiona RCL 472 (SCM) |
| 12.0 | Schwerspat EWO (Sachtleben) |
| 22.0 | Demineralized water |
| 100 | Parts |

Component B
25 Beckopox EP 384 W/53 (Solutia)
Mixing ratio 4:1=100:25

In all examples the epoxy parent component A is made available as a 75% solution, preferably in xylole. The curing agent component B is present in the cross-linking casing in liquid, where necessary dissolved form. All above quantities are indicated as parts by weight.

The following epoxy resins (types) are suited for the purpose:

Solid Epoxy Resin:
Solids 100%, epoxy value 0.200-0.225, epoxy equivalent 445-500, viscosity mPas 25° C., 150-200 (as 40% solution in butyl diglykol), density at 20° C., 1.19, flow point >200° C., Gardner color index <2.

75% Solution:
Solids 75%, solvent xylole, epoxy value 0.150-0.169, epoxy equivalent 590-666, viscosity mPas 25° C. approx. 10000, density at 20° C., 1.08, flow point 24° C., Gardner color index <3.

Brand Names:
Epon Resin 1001 CX 75, Epikote 1001/75 Resolution, formerly Shell, Down Resin 671/75, Down Eurepox 7001/75, Schering Beckopox EP 301-x-75 Solution, formerly Vianova.

Liquid Epoxy Resin:
Solids 100%, medium viscosity, resistant to crystallization, epoxy value 0.52-0.55, epoxy equivalent 182-192, viscosity mPas 25° C., 6500-9000, Gardner color index <4, density at 20° C., 1.17, flow point 180° C.

Brand Names:
Epikote 828, Beckopox EP 116, Dow resin 330, Eurepox 720.

Water-dilutable systems are customarily prepared in the curing agent and cured with the pure epoxy component.

Suitable amines for curing purposes are for example:
modified aliphatic polyamine dissolved in water, viscosity mPas 25° C., 10000-17000, iodine color index max. 10, H-active equivalent weight (solid resin) 160, density at 25° C. 1.10, flow point >100° C.

Brand Names:
Beckopox Spezialhärter EH 623w, Vianova Härter EH 623/80, Solutia, Härter XB 3984, Ciba.

The invention claimed is:

1. Two-component aerosol paint can with an aerosol preparation, especially for the automotive industry and automotive repair purposes, containing a binding agent component and a curing agent component, characterized in that the binding agent component contains an epoxy parent component capable of being cured, solvent and propellant gas, and the curing agent component contains a cross-linking agent capable of causing the epoxy binding agent to cure, with the curing agent component being accommodated in a cross-linking casing which is located in the aerosol paint can separately from the binding agent component and can be activated externally; and wherein said paint can has an inner casing attached to a cup in the can bottom, a push rod arranged in the inner casing said rod being actuated through the cup and intended to force open the inner casing and acting on a cover arranged at the can-side end of the inner casing and forcing off said cover when actuated.

2. The aerosol paint can according to claim 1, characterized in that a 3:1 through 6:1 ratio by weight exists between the epoxy parent component and the curing agent component.

3. The aerosol paint can according to claim 2, characterized in that the ratio by weight is 4:1 through 5:1.

4. An aerosol paint can according to any one of the above claims, characterized in that the curing agent component contains an aliphatic, cycloaliphatic or aromatic amine, its reaction products and adducts, a polyaminoamide, dicyandiamide, cyclic acid anhydride, a polyisocyanate or aminofunctional polyacrylate.

5. An aerosol paint can according to claim 1, characterized in that the epoxy parent component and solvent are present at a ratio by weight of between 75:25 and 50:50.

6. The aerosol paint can according to claim 5, characterized in that the spraying viscosity is between 18' and 30' in a DIN beaker with 3-mm nozzle.

7. Aerosol paint can according claim 1, characterized in that the binding agent component contains ketones, esters, alcohol and/or aromatics as solvent.

8. The aerosol paint can according to claim 7, characterized in that the solvent consists of ketones and esters of a ratio by weight ranging between 50:50 and 90:10.

9. The aerosol paint can according to claim 8, characterized in that the solvent contains acetone and butyl acetate of a ratio by weight ranging between 80:20 and 90:10.

10. An aerosol paint can according to claim 1, characterized in that it contains an epoxy parent component based on glycidyl ethers, glycidyl esters, glycidyl amines, cycloaliphatic epoxys and glycidyl isocyanurates.

11. An aerosol paint can according to claim 1, characterized in that the binding agent component contains 25 to 60% by weight of propellant gas.

12. The aerosol paint can according to claim 11, characterized in that it contains dimethyl ether, propane and/or butane as propellant gas.

13. The aerosol paint can according to claim 12, characterized in that it contains dimethyl ether.

14. The aerosol paint can according to claim 13, characterized in that the binding agent component contains 54% by weight of dimethyl ether.

15. Aerosol paint can according to claim 1, characterized in that the epoxy parent component contains customary additives, in particular pigments, solvents, stabilizers, agents used to influence rheology and/or viscosity and/or emulsifiers.

16. Aerosol paint can according to claim 1, characterized in that it is provided with a low-pressure flat-spray nozzle.

17. Aerosol paint can according to claim 1, characterized by an internal pressure of 4.5 to 6 bar up to 20° C.

18. Aerosol paint can according to claim 17, characterized by an internal pressure of 5.0 to 6.5 bar up to 20° C.

19. The aerosol paint can according to claim 1, characterized in that the inner casing consists of metal, preferably aluminum.

20. The aerosol paint can according to claim 1, characterized in that the inner casing has a metal membrane arranged on its bottom end, with the push rod being divided into a trigger pin arranged external to the inner casing and projecting through the can bottom and a push element arranged inside the inner casing.

21. The aerosol paint can according to claim 1, characterized in that the inner casing forms an integral pad or is integrally connected with the cup of the can bottom.

* * * * *